Nov. 2, 1971  A. ANGIOLETTI ETAL  3,616,496
APPARATUS FOR PRODUCING A BAND OF UNCURED ELASTOMERIC
MATERIAL EMBEDDING A PLURALITY OF REINFORCING WIRES
Filed July 28, 1969  3 Sheets-Sheet 2
FIG. 2
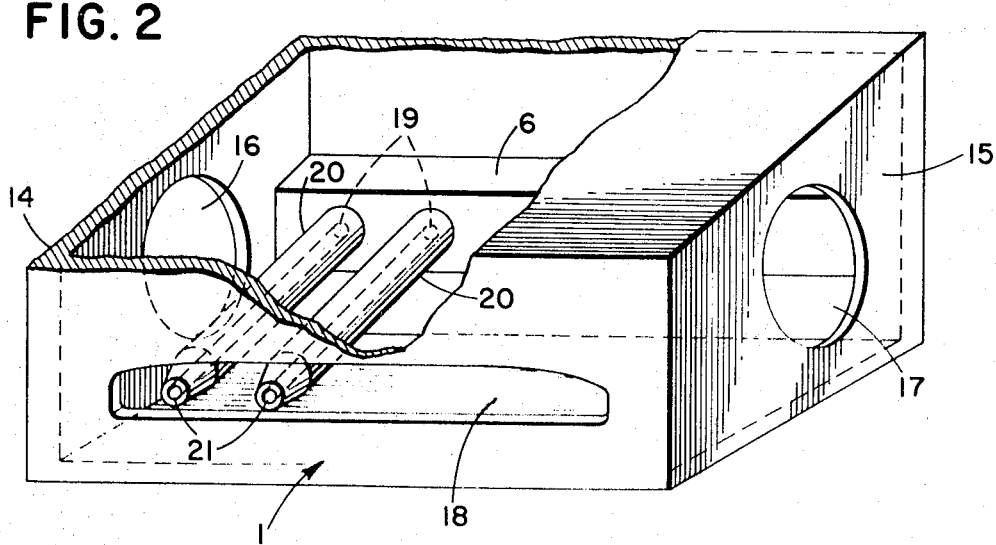
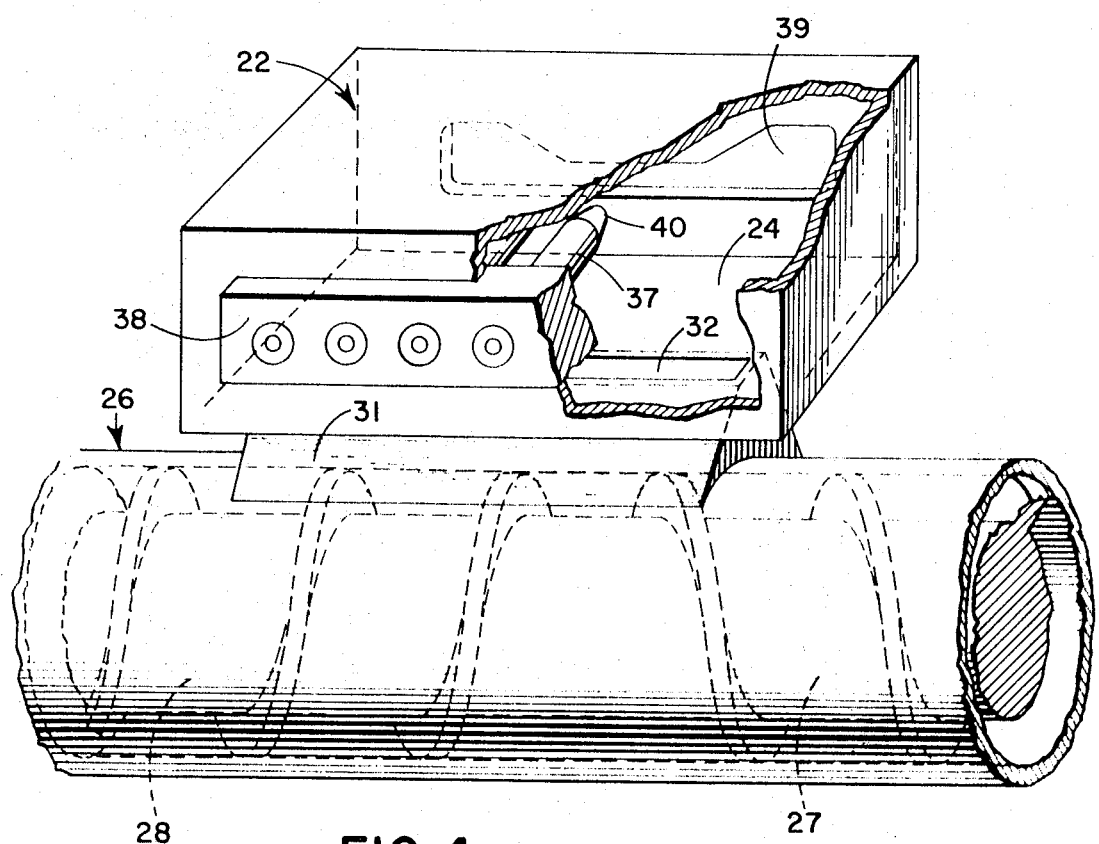
FIG. 4
INVENTORS
ATTILIO ANGIOLETTI,
NINO MADONINI
BY
Stevens, Davis, Miller & Mosher
ATTORNEYS 3,616,496
APPARATUS FOR PRODUCING A BAND OF UNCURED ELASTOMERIC MATERIAL EMBEDDING A PLURALITY OF REINFORCING WIRES
Attilio Anglioletti and Nino Madonini, Milan, Italy, assignors to Industrie Pirelli S.p.A., Milan, Italy
Filed July 28, 1969, Ser. No. 845,386
Claims priority, application Italy, Mar. 15, 1969, 839,577/69
Int. Cl. A22b 5/08
U.S. Cl. 18—13 H                    7 Claims

ABSTRACT OF THE DISCLOSURE

Apparatus for producing a band of uncured elastomeric material in which a reinforcement in the form of a plurality of strands disposed parallel to each other is embedded. The apparatus comprises a generally rectangular hollow extrusion head having a discharge opening, parallel guides in the extrusion head for receiving the strands and guiding the strands to an elongated discharge opening in one wall of the extrusion head, and means communicating with the extrusion head for supplying elastomeric material to the extrusion head so that the strands may be embedded in the elastomeric material as the latter is extruded in uncured condition and in the form of a band from the extrusion head.

---

The present invention aims at providing apparatus including an extrusion head by means of which it is possible to embed strands, preferably made of metallic material and of any diametrical size, in a band of uncured elastomeric material obtained with said head during its production.

A further object of the invention is to provide a band of uncured elastomeric material in which reinforcing metal wires are embedded and disposed in the direction of its length, and which is produced by the above apparatus.

The apparatus according to the invention affords, over the conventional ones, the advantage that the reinforcing wires are exactly parallel to one another inside the band, the thickness of which is perfectly uniform. As a consequence of the above features, in the band produced by means of said apparatus the mechanical characteristics are constant along its whole development.

A further advantage obtained with the use of the apparatus is that the reinforcing wires can be simply and correctly embedded within the uncured elastomeric material, with a consequent reduction of production rejects, due for instance to the presence of air bubbles in the area of contact between the wires and the elastomeric material.

Other advantages of the apparatus according to the invention is that it permits a high production rate relative to labor costs, together with reduced plant costs. These in turn result in a reduced cost of the article produced.

Briefly summarized the present invention is an apparatus for producing a band of uncured elastomeric material in which a plurality of parallel reinforcing wires, preferably made of metal, is embedded and disposed along the band length, characterized in that it comprises an extension head for the formation of the band, having a generally box-like shape and hollow in its inside, the head being provided on a first wall with an elongated discharge opening corersponding in width and thickness to the desired width and thickness of the band, and which is provided on a second wall with a plurality of openings to receive the reinforcing wires. The head is provided with wire-guiding tubes communicating with said openings and extending inwardly the extrusion head to points in close proximity to the discharge opening, together with means for the supply of the elastomeric material to the extrusion head in such manner that the material exudes uniformly along the entire length of the elongated discharge opening.

The present invention will be better understood from the following detailed description, given by way of non-limiting example and made with reference to the attached drawings, in which:

FIG. 2 is a perspective view, partially in section, of the extrusion head shown in FIG. 1;

FIG. 4 is an enlarged fragmentary view of the apparatus shown in FIG. 3.

Figure 1:
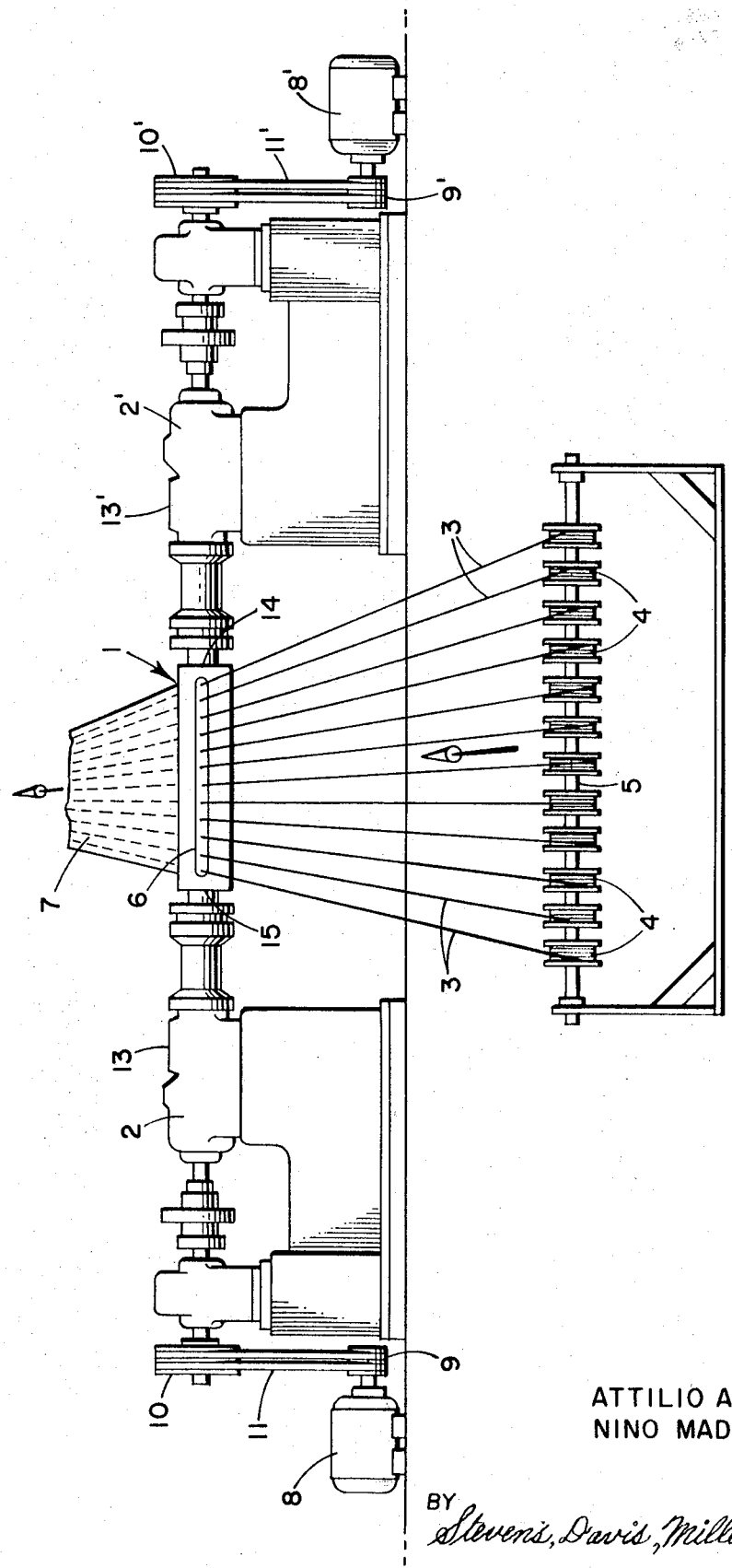
FIG. 1 is a diagrammatical view of the apparatus for the production of a reinforced band.

As can be seen in FIG. 1, an extrusion head 1 is supplied with elastomeric material from two extruders 2 and 2' at opposite sides 14 and 15. A plurality of wires 3 is fed from bobbins 4 disposed on a simple shaft 5 supported at both ends and enters the extrusion head through holes provided at an element 6, temporarily fast or forming a single unit with the extrusion head. A band 7 of uncured elastomeric material is discharged from the extrusion head through an opening not illustrated in the drawings.

The extruder 2 is driven by a motor 8, which puts its rotor into rotation by means of a transmission system constituted by pulleys 9 and 10 and by a driving belt 11, and is supplied through a feeding opening 13. Likewise, the extruder 2' is driven by a motor 8', which puts its rotor into rotation by means of a transmissioin system constituted by pulleys 9', 10' and by a driving belt 11', and is supplied through a feeding opening 13'.

As stated above, the two extruders 2 and 2' convey the elastomeric material to the extrusion head 1 at its sides 14 and 15, opposite to each other and, as it is clearly visible in FIG. 1, the extruder 2, the extruder 2' and the extrusion head 1 are aligned.

The features of the extrusion head in its preferred embodiment are clearly represented in FIG. 2. The extrusion head 1 has a box-like shape and is provided on its sides 14 and 15 with openings 16 and 17, respectively, at which the means (not illustrated) for connecting the extrusion head to the extruders 2 and 2' are situated.

The extrusion head is hollow and its cavity is so shaped that the mass of elastomeric material may pass from the openings 16 and 17 to the opening 18 in such a way that its distribution at the latter opening is as uniform as possible, taking into account that, inside the extrusion head, said mass of elastomeric material undergoes a deviation of 90°, moving along substantially hori zontal planes.

The opening 18 may have variable dimensions along its whole development; for instance, it could be smaller at its ends and larger at its centre in view of the different pressures taking place at its various zones. In particular, the pressures are greater at the ends of the opening and less at its central portion.

As the material undergoes a swelling in its passage from the inside of the extrusion head, where it is subjected to a pressure, to the outside, where it is at atmospheric pressure, in order to obtain a band of uniform thickness, the width variation of the opening 18 is determinated as a function of the swelling degree of the elastomeric material.

As indicated above, the wires 3, preferably made of metal to be embedded in the band 7 of elastomeric material, penetrate in the extrusion head through the holes 19 and come out embedded in the band. The wires 3 are guided in their travel through the extrusion head to points short of the opening 18 due to the fact that in practice the fluid flow of the mass of elastomeric material, which travels within the extrusion head, takes a position parallel to the direction of motion of the wires only at said opening and therefore, to maintain said wires aligned and equidistant, it is necessary to protect them against the pressure exerted by the elastomeric material.

Moreover, in order to prevent harmful deviations in the travel of the fluid flow in proximity of the unguided portions of the wires, the ends 21 of the wire-guiding tubes 20 are tapered.

The wire-guiding tubes 20, as shown in FIG. 2, project in cantilever fashion towards the inside of the extrusion head, extending from an element 6 in the form of an interchangeable prismatic support.

The opportunity of using such interchangeable prismatic supports for the wire-guiding tubes can be easily understood by thinking that bands having different features can be produced with the extrusion head by simply replacing a support with another one adapted to carry out the desired function.

By using an interchangeable prismatic support, it is in fact possible to produce bands which differentiate from one another with respect to the diametrical size of the wires or spacing apart the wires at different distances. Further, interchangeable prismatic supports can be foreseen to incorporate in a band of elastomeric material wires of different diametrical size, differently spaced from one another.

According to an alternative embodiment of the invention, not illustrated, the wire-guiding tubes 20 are not carried by an interchangeable prismatic support but are simply fastened to the extrusion head 1. Also in this alternative embodiment the wires do not undergo any deviation in their passage in the extrusion head, while the elastomeric material undergoes a deviation of 90° in its travel through the extrusion head, moving on horizontal planes.

Figure 3:
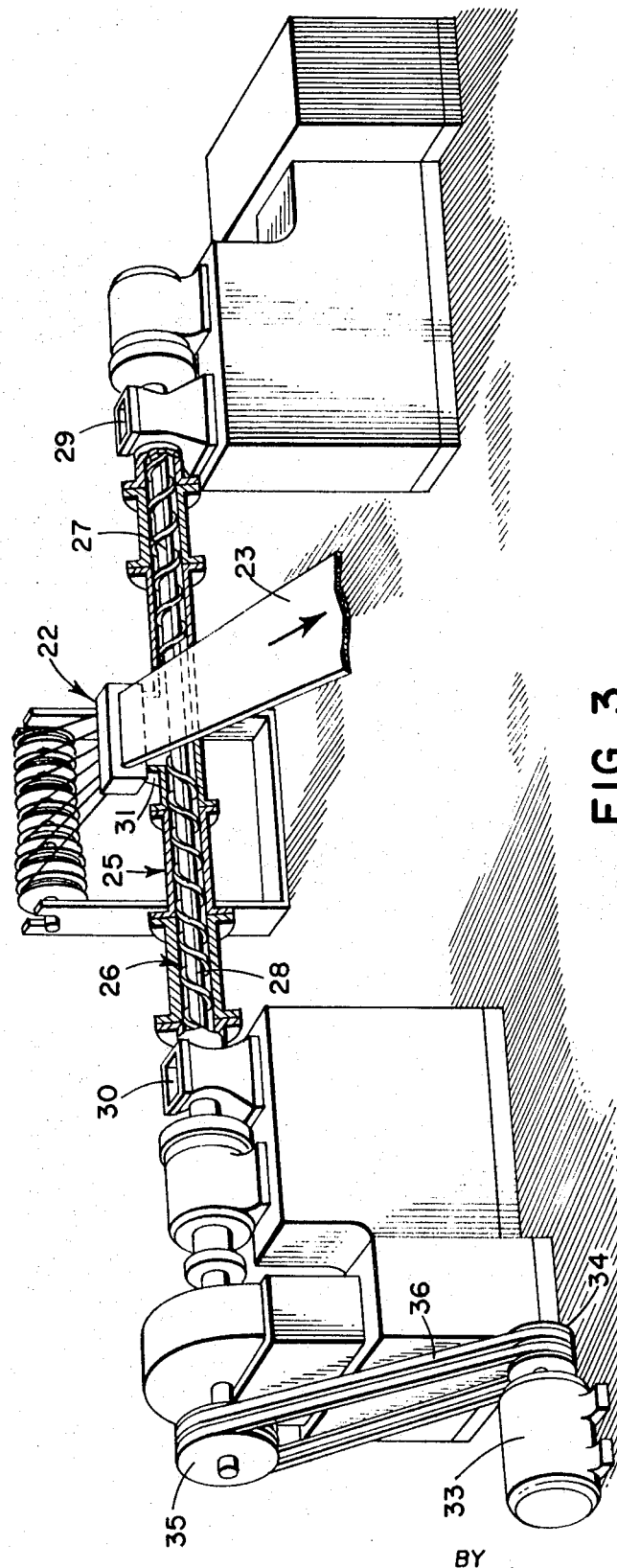
FIG. 3 is a perspective view of an alternative embodiment of the apparatus for the production of the reinforced band.

A further alternative embodiment is represented in FIG. 3. For the sake of clarity, FIG. 4 represents in enlarged scale a detail of FIG. 3 comprising the extrusion head. In these figures the extrusion head 22 for the formation of a band 23, containing reinforcing wires arranged along its length, is fed only at one side 24 and is disposed over an extruder 25, whose rotor 26 is constituted by two parts 27 and 28, integral to each other and having opposed helical threads.

The elastomeric material is loaded at both ends of the rotor through the feeding openings 29 and 30, and is unloaded through a duct 31 in the extrusion head 22, passing through an aperture 32, obtained on its side 24. To impart motion to the rotor 26 of the extruder 25, provision is made of a single motor 33 and of a transmission system, composed of pulleys 34, 35 and of a driving belt 36.

The details of the extrusion head are clearly represented in FIG. 4. Also in this case, to embed the wires in the band of uncured elastomeric material, wire-guiding tubes 37 are provided on an interchangeable prismatic support 38. The length of the tubes is such that they extend to points in close proximity of the band discharge opening 39, and their free ends 40 are tapered.

As previously stated, the provision of the wire-guiding tubes 37 which extend as far as in close proximity to the discharge opening 39 is due to the fact that the wires are to be protected against the pressure of the elastomeric material, which tends to alter their parallel arrangement and their correct centering inside the band. The fluid flow, in fact, is directed in the direction of motion of the band only when it is at the opening 39 and, inside the extrusion head, the elastomeric material undergoes a deviation of 90°, moving along vertical planes.

In this case the discharge opening, for the reasons stated above, is larger at its ends and narrower at its centre, and the provision of an interchangeable prismatic support 38 for the wire-guiding tubes permits, as already said, the use of a single extrusion head to produce different bands embedding wires of different diametrical size, or wires disposed at different distances, or wires having different diametrical size and disposed at different distances in one same band.

Of course, in an alternative embodiment (not shown) instead of using a single extruder, it is possible to employ two extruders, facing each other and having independent rotors, the extruders being constituted by a single body or by two bodies tightly connected to each other.

According to a further alternative embodiment, instead of positioning the extrusion head over the extruder or extruders, the head may be positioned below them.

As it appears from the above indicated embodiments, the wires to be embedded in the band maintain a rectilinear path in their passage through the extrusion head, while the elastomeric material undergoes a deviation. However, it is possible to foresee an extrusion head in which the elastomeric material is not subjected to any deviation, whereso the wires are subjected to a deviation of 90°. In this embodiment (not illustrated) the use of one extruder is sufficient.

Although several embodiments of the present invention have been described, it should be understood that the invention comprises any possible embodiment falling within the scope of the following claims.

We claim:

1. An apparatus for extruding an uncured elastomeric material as an elongate member having elongate reinforcing wires embedded therein running lengthwise thereof and accurately positioned parallel to each other and at respective predetermined transverse spacings from each other, said apparatus comprising: a hollow extrusion head having an inlet opening for the elastomeric material and an outlet opening therefor configured in accordance with the desired cross-sectional shape of the member to be extruded therefrom, a plurality of hollow guide members fixedly mounted within said head and having open discharge ends located in close proximity to said outlet opening, said guide members each being arranged to receive a reinforcing wire therein and to pass it into said elastomeric material substantially in correspondence to said material passing through said outlet opening.

2. The apparatus as defined by claim 1, characterized in that the means for supplying the extrusion head for the member formation include two extruders, between which is interposed said extrusion head, and which is therefore supplied from two opposite ends, said extruders and the extrusion head being aligned relative to each other.

3. The apparatus as defined by claim 1, characterized in that the means for supplying the extrusion head for the member formation includes two extruders, whose bodies are joined at the extruders' heads and whose axes lie on a same horizontal straight line extending to one side of the extrusion head, a duct being provided to convey the elastomeric material from the two extruders to the extrusion head, said duct placing into communication the zone of connection of the bodies of the two extruders with an opening provided on one face of the extrusion head, which lies on a horizontal plane parallel to the forward motion of the member being formed.

4. The apparatus as defined by claim 1, characterized in that the means for supplying the extrusion head for the member formation includes a screw extruder disposed to one side of said extrusion head, said extruder comprising a rotor formed by two parts integral to each other, each part having opposite helical threads, and being supplied independently of the other at the rotor ends to convey the elastomeric material to the extrusion head for the member formation through a duct which connects the extruder, at the point where the opposite helical threads of a rotor meet, with an opening in the extrusion head which is provided on one of its faces lying in a horizontal plane parallel to the forward motion of the member being formed.

5. The apparatus as defined by claim 1, characterized in that the plurality of openings for the passage of the wires to be embedded in the member is provided on an interchangeable prismatic support, which can be removably connected to one face of said extrusion head for the member formation, said support, on its portion which is internal to said extrusion head for the member formation, being provided, at said holes with hollow protuberances constituting wire-guiding tubes.

6. The apparatus of claim 1, wherein said guide members are elongate tubes extending from said outlet opening to a boundary wall of said extrusion head, and have open inlet ends for wires at said boundary wall whereby the extent of reinforcing wires passing through said head are completely enclosed within said guides and thereby shielded from the elastomeric material within said head.

7. The apparatus of claim 1, said inlet and outlet openings in said extrusion head extending in mutually perpendicular planes whereby elastomeric material must change its direction of movement by substantially ninety degrees in flowing through said head from said inlet to said outlet opening.

References Cited

UNITED STATES PATENTS

| | | | |
|---|---|---|---|
| 1,934,647 | 11/1933 | State et al. | 18—13 |
| 2,204,782 | 6/1940 | Wermine | 18—13 |
| 3,404,433 | 10/1968 | Krutchen et al. | 18—13 |

FOREIGN PATENTS

| | | | |
|---|---|---|---|
| 919,078 | 2/1963 | Great Britain | 18—13 |

TRAVISS S. McGEHEE, Primary Examiner